May 26, 1942.   J. H. POWERS   2,284,446
ANTIFRICTION BEARING
Filed Dec. 13, 1940

Inventor:
James H. Powers,
by Harry E. Dunham
His Attorney.

Patented May 26, 1942

2,284,446

UNITED STATES PATENT OFFICE 2,284,446

ANTIFRICTION BEARING

James H. Powers, Fort Wayne, Ind., assignor to General Electric Company, a corporation of New York Application December 13, 1940, Serial No. 369,972

3 Claims. (Cl. 308—187.1)

This application is a continuation-in-part of my application Serial No. 316,769, filed February 1, 1940.

The present invention relates to anti-friction bearings, with reference more particularly to lubrication and sealing thereof.

The invention has for one of its objects the provision of improvements in lubrication and sealing of tapered or conical roller bearings, by reason of which improvements it is made possible to provide permanent and effective lubrication of the bearing surfaces with a supply of clean lubricant, properly controlled so as to insure against subjection of the bearing parts to undue strain, wear, or temperature rise, such as would occur if the parts were whipped through an oversupply or immersing body of lubricant.

A still further object is the provision of an improved bearing seal for preventing contamination of a bearing and its lubricant by passage of fluid from a housing in a wall of which the bearing is supported.

Other objects and the details of that which I consider to be novel and my present invention will become apparent from the following description and the appended claims, taken in conjunction with the accompanying drawing wherein is shown an exemplary embodiment as employed in a waste disposal apparatus similar to that disclosed in my Patent 2,220,729. Since, as will become apparent hereinafter, my invention is not limited to employment solely in the manner and with the particular apparatus illustrated, only sufficient of the details of this apparatus will be described herein as will insure a proper understanding of the invention and its potential applications.

Figure 1:
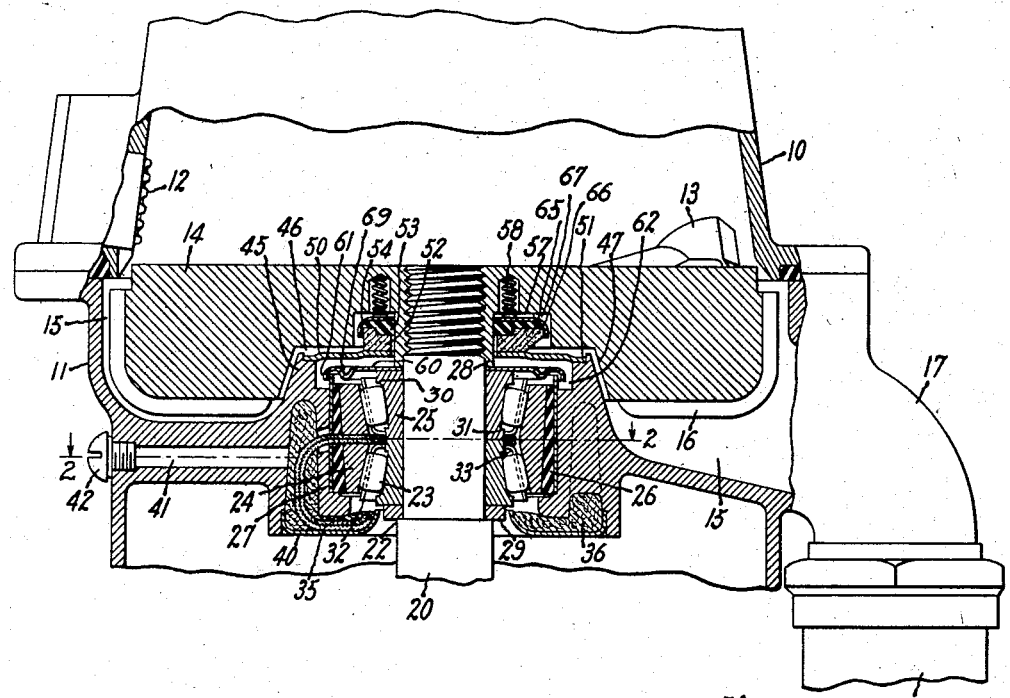
Figure 2:
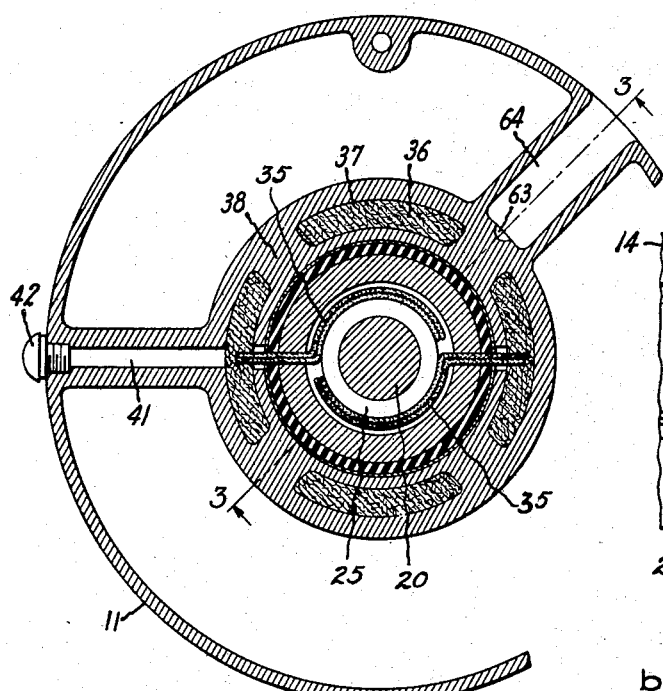
Figure 4:
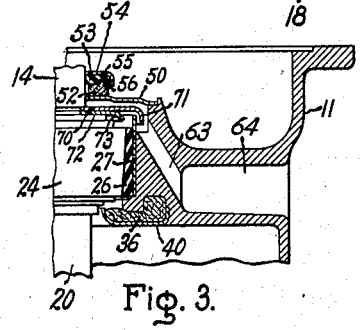
Figure 3:
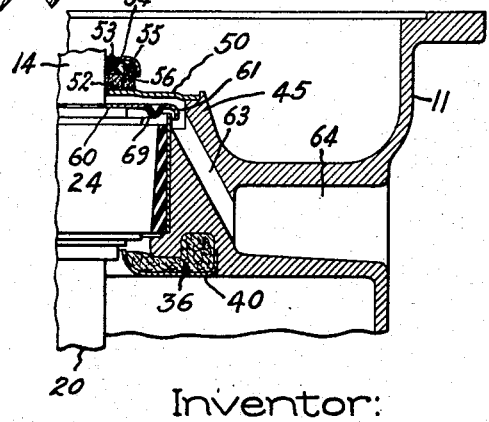

In the drawing, Fig. 1 shows in sectional elevation a portion of the waste disposal apparatus and the details of construction of a double conical roller bearing embodying my invention; Fig. 2 is a sectional plan view along the line 2—2 of Fig. 1; Fig. 3 is a sectional elevation along the line 3—3 of Fig. 2 showing a detail of a part of the structure of Figs. 1 and 2; and Fig. 4 is a fragmentary view similar to Fig. 3 of a modification.

The waste disposal apparatus, shown in part in the drawing, has a housing which includes a casing member 10, designed to provide a grinding chamber, and a bottom flange or closure member 11. Within the housing is a grinding mechanism which includes a stationary shredding element 12, mounted in a wall of casing member 10, and one or more material impelling elements 13 supported on a rotatable flywheel 14. This mechanism is operable to effect comminution of waste material, such as garbage, with the aid of water supplied to the grinding chamber. During the grinding operation, the flowable mixture of water and comminuted material passes through the clearance between the flywheel and the lower edge of the casing member into an annular compartment 15 formed in the bottom flange member. Vanes 16 on the flywheel serve to pump the flowable mixture from compartment 15 through a discharge conduit 17 to a sewer connection or the like indicated at 18. Flywheel 14 is mounted on the upper end of a vertical shaft 20 rotatably supported in a bearing assembly, hereinafter described, which is centrally mounted in bottom flange 11. Rotation of the flywheel is effected by a motor (not shown) which is connected in any suitable manner with the lower end of shaft 20.

The supporting bearing is of the double row conical roller type, comprising a plurality of tapered rollers 23 assembled in two annular series around shaft 20 and disposed between an outer raceway member 24 and an inner raceway member 25. The outer raceway member is of one-piece construction and is non-rotatably and resiliently supported by a sleeve 26 of chemically resistant synthetic rubber-like material, such as neoprene, which is not subject to deterioration due to exposure to oil. Sleeve 26 is bonded to, and supported by, a metallic sleeve 27 which is pressed into a cylindrical seat in the bottom flange. Member 24 provides two coaxial conical raceways arranged with the smaller diameter ends thereof in contiguity. Inner raceway member 25 is comprised of two parts fixedly secured on the shaft and arranged to provide two conical raceways which also have their smaller diameter ends in contiguity. Proper positioning of inner raceway member 25 is maintained by clamping the two parts of the raceway member between a depending skirt 28 on the flywheel and a collar 29 which bears against a circumferential shoulder 22 on shaft 20. Annular thrust ribs or shoulders 30, for engagement with the outer ends of the rollers, are provided adjacent the outer larger diameter ends of the inner raceways, and similar ribs or shoulders 31 are provided at the smaller diameter contiguous ends of the inner raceways. The two annular series of rollers are assembled respectively between the upper and lower sets of raceways so that the smaller diameter ends of the rollers of the upper cone assembly are toward the smaller diameter ends of the rollers on the lower cone assembly. Two conical cages 32 maintain proper spacing and positioning of the rollers respectively of the upper and lower assemblies. The smaller diameter ends of these cages, which are in contiguity, have end flanges 33 curving smoothly in toward the shaft.

The illustrated bearing, as described so far, is of a general form and arrangement known in the art. However, of the various methods heretofore employed for lubricating such a bearing, I have found none entirely satisfactory under all conditions, this being particularly true of those installations wherein the axis of the bearing is vertical or wherein an effective permanent lubrication is desired. By a permanent lubrication system is meant one wherein the bearing, after once being charged with lubricant, uses the lubricant over and over and requires no replenishment over a long period of service, preferably approaching the effective bearing life. In some cases it has been the practice to immerse the bearing, either partially or wholly, in a body of oil, but I have found, particularly in connection with high speed installations, that the resultant churning and the resistance offered to the bearing parts by the body of oil produces undesirable strain, wear, and heating. It has been proposed also to supply a flow of oil to the midportion of the bearing between the annular series of rollers to the end that the centrifugal pumping action of the conical bearing parts may effect distribution of the oil through the bearing. In this latter case it is difficult, if not impossible, properly to control the supply of oil. If too small a flow of oil is supplied to the midportion of the bearing, the pumping action will not be effective to produce proper distribution of oil over the rollers of the upper series, while an oversupply of oil may result in the undesirable churning of the oil and heating and wearing of the bearing as previously mentioned.

In order to provide a dependable permanent lubrication which avoids the difficulties mentioned, I have devised as one feature of the present invention a lubrication arrangement which affords a properly controlled supply of oil to the bearing parts and insures an even distribution of the oil throughout the bearing. In accordance with this feature of the invention, oil is supplied to the midportion of the bearing by means of wicking which is fed from a reservoir comprised of a body of oil saturated sliver wool or like fibrous material. Two wicks 35 are employed in the illustrated embodiment, although less or more than two may be employed, depending upon the size of the wicks and the amount of oil which it is desired to furnish to the bearing. These wicks, throughout considerable portions of their lengths, are disposed in or extend through a reservoir comprised of oil saturated sliver wool, indicated at 36. Bottom flange 11 has compartments 37 formed therein around the bearing and separated by reinforcing partitions 38, which compartments accommodate the sliver wool with the wool in each compartment extending below the open lower end of the compartment and interconnecting with the wool in the adjacent compartments. An annular retaining cup 40, pressed into a cylindrical seat in the bottom flange, holds the sliver wool in the compartments and serves to catch any free oil. A passage 41, closed at its outer end by a screw 42, is provided in the bottom flange for charging the reservoir with oil. However, as will become apparent hereinafter, the bearing after once being charged, uses the oil over and over, and there is little chance for escape of the oil from the bearing, so that recharging of the reservoir is necessary only infrequently, if at all.

Wicks 35 extend from the reservoir through radial passages formed by registering openings in bottom flange 11, sleeves 26 and 27 and outer raceway member 24, into the space between the upper and lower series of rollers, in which space substantial lengths of the wicks lie in contact with the rounded flanges 33 at the smaller diameter ends of cages 32. During rotation of shaft 20 and the cages, a steady supply of oil, of relatively small but sufficient amount, is deposited by the wicks on flanges 33. Under the influence of centrifugal force produced by rotation of the tapered cages, the oil deposited on the flanges, in the form of a thin film, flows or travels upwardly and downwardly over the surfaces of the upper and lower cages, respectively, toward the larger diameter ends of the cages. Rollers 23 pick up the oil from the cages and distribute it to the inner and outer raceways. The oil films on the surfaces of the various bearing parts are caused to travel toward the upper and lower ends of the bearing by reason of the centrifugal force produced by rotation of the tapered cages, rollers and inner raceways all of which have their larger diameter ends adjacent the outer ends of the bearing. That part of the oil which is pumped upwardly to the top of the bearing seeps back down through the bearing with the aid of gravity, and, along with the oil which is pumped downwardly through the lower half of the bearing, is caught by retaining cup 40 and returned to the sliver wool reservoir.

I have found that, by reason of the oil being distributed only in the form of a thin film, there is no tendency for oil to be thrown out of the upper end of the bearing or to build up so as to flow out over the upper rim of sleeve 27. Thus, all of the oil which is distributed through the bearing is returned to the sliver wool reservoir without loss. A further advantage of the wick feed and the distribution of oil in the form of a thin film over the surfaces of the bearing parts, is that there does not occur an oversupply such as would result in the undesirable churning and heating previously mentioned as being attendant upon flowing of oil to the bearing or immersion of the bearing.

It is essential that the oil with which the bearing is charged be kept clean in order that the permanent lubrication system previously described may remain efficient throughout long periods of service. The wicking and the sliver wool of the reservoir tend to strain out solid particles such as might result from wearing of the bearing parts. In order to prevent contamination of the bearing and its lubricant by fluids or solid particles which might gain access from outside sources, such as from the discharge compartment 15 in the housing of the waste disposal apparatus of the exemplary embodiment illustrated, I have provided an improved construction and arrangement of baffling and sealing parts now to be described.

Bottom flange 11 has a centrally located upwardly projecting annular ridge 45 which is accommodated in a conical recess 46 formed in the bottom of flywheel 14. The outer surface of ridge 45 is conical and extends in relatively close parallel relation to the downwardly and outwardly flaring side walls 47 of recess 46. By reason of this construction, a considerable portion, if not all, of any fluid which enters the restricted space between ridge 45 and walls 47 during rotation of the flywheel, is repelled downwardly under the influence of centrifugal force induced by frictional engagement of the fluid with the downwardly and outwardly slanting walls 47.

Fluid which gets by the space between ridge 45 and walls 47, during either rotation or non-rotation of the flywheel, is prevented from reaching the bearing by a bearing seal which includes a disklike sealing ring 50, the outer periphery of which is tightly pressed into a circular flanged seat in the top of ridge 45, as shown at 51. Pressing on the upper surface of ring 50, adjacent the inner periphery thereof, is an annular nose-piece 52 which is comprised of a suitable wear-resisting material, such as Textolite, and which nose-piece is backed on its upper side by an annular washer 53 of chemically resistant, rubberlike material, such as neoprene. Washer 53 in turn is backed by an inverted cup-shaped metallic retaining ring 54, and has an annular recess 55 engaged by an annular ridge 56 on nose-piece 52 so as to effect a sealed junction between the washer and nose-piece. The assembly comprised of nose-piece 52, washer 53, and ring 54, is disposed in an annular recess 57 formed in the flywheel in communication with recess 46, and the inner surface of washer 53 is in tight sealing engagement with the inner wall of recess 57 so as to prevent leakage of fluid at this point. Nose-piece 52 has one or more radial lug portions 65, each of which projects into a seat formed in a lug 66 on the outer periphery of ring 54. Lug 66 projects into a recess 67 which forms a radial extension of the recess 57 in flywheel 14. Thus, the nose-piece, washer and retaining ring are constrained to rotate with the flywheel and relative to sealing ring 50. The nose-piece is maintained in sliding sealing engagement with ring 50 by means of springs 58 which are disposed in vertical bores in the flywheel and press downwardly on retaining ring 54.

As a still further precaution against access of contaminating fluid to the bearing, I have provided an annular deflecting plate 60 which is clamped at its inner periphery between the top of inner raceway member 25 and the bottom of the depending skirt 23 of the flywheel, so that plate 60 is rotatable with shaft 20. The deflecting plate extends outwardly in underlapping relation to sealing ring 50 and has at its outer periphery a flange 61 which curves downwardly over sleeve 27 to a point below the upper rim of this sleeve. Thus, any fluid which might escape past the sealing elements previously described, is deflected by plate 60 into the annular space 62 formed between the upper end of sleeve 27 and the inner surface of ridge 45 of the bottom flange. Any fluid reaching space 62 is drained therefrom through passages 63 and 64 formed in the bottom flange as shown in the detail view of Fig. 3. As a precaution against oil being thrown from the rotating bearing parts outwardly through the clearance between plate 60 and the upper rim of sleeve 27, in case very light oil is employed in the bearing, plate 60 is provided with a depending circular ridge 69. This ridge is located just inside of sleeve 27, and serves to deflect any outwardly thrown oil downwardly into the space within the upper end of the sleeve.

When flywheel 14 and shaft 20 are at rest, nose-piece 52 and washer 53 have maximum effectiveness of sealing action and prevent leakage of fluid into the bearing. When the flywheel and shaft are in rotation, the sealing action of the nose-piece may be slightly reduced, but under these conditions the action of the flaring walls 47 of the recess 46 in the flywheel is effective greatly to restrict the amount of fluid which can gain access to the sealing elements. And finally, such small quantities of fluid as might escape past the seal, due to wear of any of the sealing elements from long periods of service, will be prevented by deflecting plate 60 from reaching the bearing. Thus I positively insure against contamination of the bearing and its lubricant under all conditions.

In Fig. 4 is shown a modification in which the deflector is in two parts; an upper plate 70 having a flange 71 depending around and outside the sleeve 27 and serving the same function as the flange 61 of the plate 60 and a lower plate 72 having a depending flange 73 within the sleeve 27 which serves to deflect any outwardly thrown oil downward within the sleeve 27. The plates 70 and 72, like the deflector plate 60, rotate with the shaft 20 and provide a closure for the upper end of the sleeve 27. Due to the sharp edge of the flange 73, it is more effective than the ridge 69 in returning oil which may contact the under side of the deflector.

In the foregoing I have described in considerable detail the construction and operation of the illustrated exemplary embodiment in order to insure a complete understanding of my invention and its advantages. However, it is to be understood that the invention is not limited to the particular application or to the details of construction of the illustrated embodiment, and I desire to cover by the appended claims such other applications and modifications as do not depart from the true spirit and scope of my invention.

What I claim as new and desire to secure by Letters Patent of the United States, is:

1. In combination, a relatively stationary structure, a relatively rotatable structure journalled in a bearing supported by said stationary structure, and a fluid deflecting element providing a closure for said end of the bearing supporting structure, which element is substantially centrally supported for rotation with said rotatable structure and said element extending outwardly over said end of the bearing supporting structure and said element having provisions inside the bearing supporting structure effective during rotation of the element for returning lubricant from said element to the inside of said bearing supporting structure.

2. In combination, a vertical shaft, a relatively stationary supporting structure having an open upper end, a bearing for the shaft within the supporting structure, an oil reservoir in said supporting structure, means for feeding oil from said reservoir to said bearing, provisions for draining oil from said bearing to said reservoir, and a rotatable deflector on the shaft providing a closure for the supporting structure, said deflector overlapping the upper end of the supporting structure and said deflector having a ridge presented to the interior of the supporting structure for returning thereto any oil which may contact the deflector plate.

3. In combination, a vertical shaft, a relatively stationary supporting structure having an open upper end, a bearing for the shaft within the supporting structure, an oil reservoir in said supporting structure, means for feeding oil from said reservoir to said bearing, provisions for draining oil from said bearing to said reservoir, and a rotatable deflector on the shaft providing a closure for the supporting structure, said deflector overlapping the upper end of the supporting structure and said deflector having a flange depending within the interior of the supporting structure for returning oil thereto.

JAMES H. POWERS.